Patented Jan. 11, 1927.

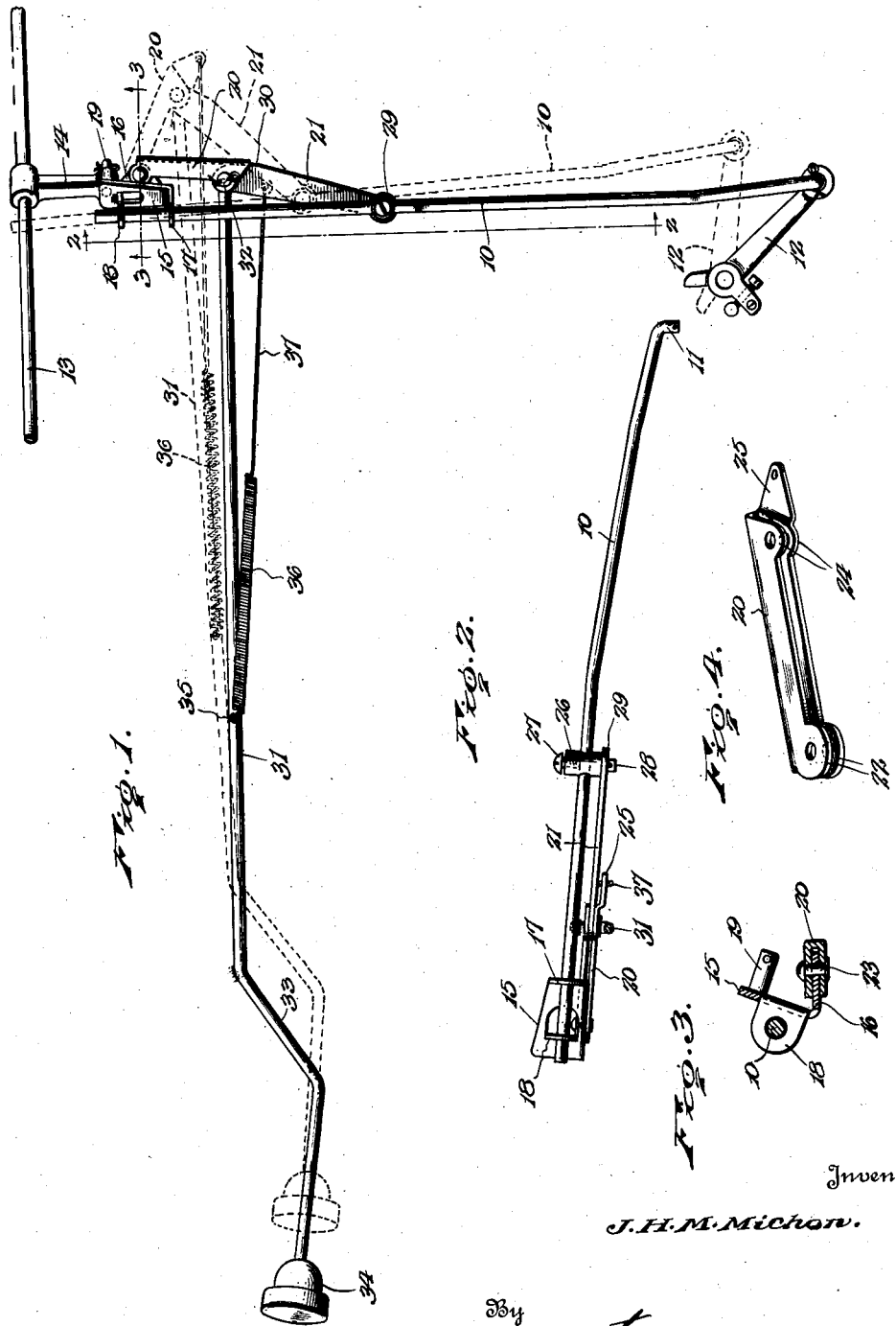

1,613,764

UNITED STATES PATENT OFFICE.

JOSEPH H. M. MICHON, OF TOLEDO, OHIO, ASSIGNOR TO JOSEPH B. LATIMER.

FOOT ACCELERATOR.

Application filed August 28, 1923, Serial No. 659,757. Renewed November 22, 1926.

This invention relates to an improved foot accelerator particularly applicable to Ford vehicles and seeks, among other objects, to provide an accelerator which will be structurally simple and inexpensive and yet will embody a positive graduated control of the throttle valve.

The invention seeks, as a further object, to provide an accelerator wherein initial movement of the foot will accomplish only a slow and disproportionate partial opening of the throttle to thus prevent choking of the engine or too sudden pick-up thereof, but wherein, as the movement of the foot is continued, the opening movement of the throttle will be gradually quickened.

And the invention seeks, as a still further object, to provide an accelerator which may be readily adjusted to suit the requirements of different carbureters so that the device may thus be easily and quickly applied to any Ford car.

Other and incidental objects will appear hereinafter.

In the drawing:

Figure 1 is a plan view showing my improved accelerator in connection with the throttle rod and carbureter throttle valve lever of a Ford vehicle;

Figure 2 is a sectional view on the line 2—2 of Figure 1, looking in the direction of the arrows;

Figure 3 is a detail section on the line 3—3 of Figure 1, looking in the direction of the arrows, and Figure 4 is a detail perspective view of one of the toggle links employed.

In carrying the invention into effect, I employ a pull rod or throttle rod 10 which supplants the usual throttle pull rod of a Ford vehicle and is bent laterally near one end to form a terminal 11 for connecting the rod to the customary throttle valve lever 12 of the vehicle carbureter. The throttle control rod or element of the vehicle is conventionally illustrated at 13 and the usual arm thereon at 14, the rod being, under standard practice, manually rotatable for opening and closing the throttle valve. Slidably supporting the rod 10 at the end thereof opposite the terminal 11 is an angle of opposite the terminal 11 is an angle shaped coupling plate having lateral wings 15 and 16 which, as shown in Figure 3, lie at an acute angle with respect to each other. The wing 15 is tapered from its outer end toward its inner end, near the latter of which said wing is bent laterally to form a lug and struck from the wing near its wider end is a similar alined lug 18. The lugs 17 and 18 are apertured to slidably receive the rod 10 therethrough and projecting from the forward side of the wing 15 near its upper outer corner is a stud 19 engaged through the eye at the free end of the arm 14. Thus, the coupling plate forms a connection between the pull rod and said arm.

The wing 16 of the coupling plate is triangular and pivoted thereon is a toggle link 20 with which coacts a second link 21. The link 20 is channel shaped and is provided at its outer end with ears 22 straddling the wing 16 to receive a rivet or other suitable fastening device 23 pivotally connecting the link with said wing. Near its inner end, the link is formed with somewhat smaller ears 24 and projecting longitudinally from the lower side of the link is a downwardly offset triangular lug 25. The link 21 is somewhat longer than the link 20 and associated with the outer end of the link 21 is an anchoring post 26. The post 26 is apertured to slidably receive the rod 10 therethrough and threaded through the upper end of the post to engage the rod is a set screw 27. At its lower end, the post is provided with a reduced stud 28 and formed on the outer end of the link 21 is an eye 29 freely receiving said stud therethrough, a cotter pin or like device being employed to limit the link against displacement. The inner end of the link 21 freely fits between the ears 24 of the link 20 and it is now to be noted that the link 21 is provided at its inner end portion with an angularly extending forward edge 30 to coact with the inner end of the other link.

Associated with the links 20 and 21 is a push rod 31 upturned near its forward end to form a terminal 32 extending through the ears 24 of the link 20 and through the inner end of the link 21 pivotally connecting said links, said terminal accommodating a cotter pin or other suitable fastening device securing the rod against displacement. Near its rear end, the rod is offset, as indicated at 33, to extend through the floor boards of the vehicle and detachably mounted upon the rod at its rear end is a preferably rubber foot knob 34 frictionally fitting over the rod. Secured at one end to the rod, as by a cotter pin or like device 35, is a spring 36 terminating in a wire 37 engaged with the free end of the lug 25 of the link 20.

As will now be seen in view of the foregoing, the spring 36 will exert a constant rearward pull upon the toggle links 20 and 21 so that said links will be normally swung to substantially alined position limited by the engagement of the edge 30 of the link 21 with the forward edge of the link 20. Thus, the links will normally provide a rigid connection between the coupling plate and the pull rod 10 so that, when the rod 13 is manually rotated, the coupling plate, links and pull rod will, as the arm 14 is swung, move as a unit for rocking the lever 12 and opening or closing the throttle valve. However, when the rod 31 is pushed forwardly, the link 20 will, as shown in dotted lines in Figure 1, swing upon its pivot 23 while the inner end of the link 21 will be carried forwardly with the inner end of the former link with the result that the rod 10 will be shifted endwise through the lugs 17 and 18 of the coupling plate for opening the throttle valve. Upon the release of the push rod, the spring 36 will, of course, function to immediately swing the links to their original position and close the valve. Accordingly, the push rod may be operated for controlling the throttle valve independently of the hand control for said valve. In connection with the toggle links, it is to be noted that during the initial forward movement of the rod 31, the rod 10 will be slowly shifted for opening the throttle valve only a short distance. Choking of the engine or a too sudden pick-up thereof will thus be avoided. However, as the forward movement of the rod 31 is continued, the endwise movement of the rod 10 will be progressively quickened so that but a short movement of the push rod will be required to secure a desired acceleration of the engine. The lug 25 is provided to increase the leverage of the spring upon the link 20. Furthermore, in thus locating the connection of the spring with said link, the spring will, after the links locks against each other, tend to swing both links rearwardly as a unit so that a corresponding rearward tension will be exerted against the rod 10 to prevent rattling. By loosening the set screw 27, the rod 10 may be shifted through the post 26 for varying the effective length of the rod. Thus, the device may be adjusted to suit the requirements of different carbureters so that the accelerator may be readily installed upon any Ford car regardless of the make of carbureter used.

Having thus described the invention, what is claimed as new is:

1. In an accelerator, the combination with a control element, of a throttle rod, coacting toggle links normally forming a non-yielding connection between said element and said rod whereby said element may be operated for positively shifting the throttle rod in opposite directions, and means for swinging said links and shifting the throttle rod independently of said element.

2. In an accelerator, the combination with a control element, of a throttle rod, coacting toggle links normally disposed substantially in alinement to form a non-yielding connection between said element and said rod whereby said element may be operated for positively shifting the throttle rod in opposite directions, and means for swinging said links and shifting the throttle rod independently of said element.

3. In an accelerator, the combination with a control element, of a throttle rod, coacting toggle links normally disposed substantially in alinement to form a non-yielding connection between said element and said rod whereby said element may be operated for positively shifting the throttle rod in opposite directions, means for swinging said links and shifting the throttle rod independently of said element, and yieldable means normally holding the links in substantially alined position.

4. In an accelerator, the combination with a control element, of a throttle rod, coacting toggle links normally disposed substantially in alinement to form a non-yielding connection between said element and said rod whereby said element may be operated for positively shifting the throttle rod in opposite directions, a push rod pivotally connected with said links for swinging the links and shifting the throttle rod independently of said element, and a spring extending between the push rod and one of the links and normally holding the links in substantially alined position.

5. In an accelerator, the combination with a control element, of a throttle rod, coacting toggle links normally disposed substantially in alinement to form a non-yielding connection between said element and said rod whereby said element may be operated for positively shifting the throttle rod in opposite directions, means limiting the links in substantially alined position, and yieldable means normally holding the links in said position.

6. In an accelerator, the combination with a control element, of a throttle rod, coacting toggle links normally disposed substantially in alinement to form a non-yielding connection between said element and said rod whereby said element may be operated for positively shifting the throttle rod in opposite directions, the links being formed to coact with each other for limiting the links in substantially alined position, and yieldable means normally holding the links in said position.

7. In an accelerator, the combination with a throttle rod, coacting toggle links one pivotally connected with said rod, means pivotally anchoring the other of said links, and operating means connected with the meeting ends of the links for swinging said links and shifting the throttle rod, of yieldable means extending between one of said links and said operating means and normally holding the links substantially in alinement, said yieldable means being connected with said link at a point spaced from the point of connection of said operating means with the link whereby said yieldable means is tensioned when the links are swung to shift said rod.

8. In an accelerator, the combination with a throttle, of a normally open toggle connected with the throttle and closable at a constant rate of speed for opening the throttle at gradually increasing rate of speed and means for closing said toggle.

9. In an accelerator, the combination with a throttle, of coacting toggle links normally disposed substantially in alinement and one having connection with the throttle whereby as the links are swung at a constant rate of speed said throttle will be opened at a gradually increasing rate of speed.

10. In an accelerator, the combination with a throttle, of coacting toggle links normally disposed substantially in alinement and one having connection with the throttle whereby as the links are swung at a constant rate of speed said throttle will be opened at a gradually increasing rate of speed, and yieldable means normally holding said links in substantially alined position.

11. In an accelerator, the combination with a control element, a throttle, and a throttle rod connected with the throttle, of coacting toggle links one having connection with said element and the other having connection with said rod, said links being normally disposed substantially in alined position whereby as the links are swung at a constant rate of speed said rod will be shifted for opening the throttle at a gradually increasing rate of speed, and means for swinging said links.

12. In an accelerator, the combination with a control element, a throttle, and a throttle rod connected with the throttle, of coacting toggle links one having connection with said element and the other having connection with said rod, said links being normally disposed substantially in alined position whereby as the links are swung at a constant rate of speed said rod will be shifted for opening the throttle at a gradually increasing rate of speed, means for swinging said links, and yieldable means normally holding said links in substantially alined position.

In testimony whereof I affix my signature.

JOSEPH H. M. MICHON. [L. S.]